United States Patent
Chee et al.

(10) Patent No.: US 7,948,902 B1
(45) Date of Patent: May 24, 2011

(54) METHOD OF GENERATING PACKETS WITHOUT REPETITION IN VERIFICATION OF A DEVICE

(75) Inventors: Lee-Yin Chee, Singapore (SG); Kheng Guan (Nigel) Tan, Singapore (SG); Sie-Boo Chiang, Singapore (SG)

(73) Assignee: GlobalFoundries Inc., Grand Cayman (KY)

( * ) Notice: Subject to any disclaimer, the term of this patent is extended or adjusted under 35 U.S.C. 154(b) by 2055 days.

(21) Appl. No.: 10/791,914

(22) Filed: Mar. 3, 2004

(51) Int. Cl.
*H04L 12/26* (2006.01)
(52) U.S. Cl. .................................................. 370/241
(58) Field of Classification Search .......... 370/241–253, 370/503; 716/51–115; 717/116
See application file for complete search history.

(56) References Cited

U.S. PATENT DOCUMENTS

| | | | |
|---|---|---|---|
| 4,862,399 A * | 8/1989 | Freeman | 714/738 |
| 5,383,177 A * | 1/1995 | Tateishi | 370/250 |
| 5,633,742 A * | 5/1997 | Shipley | 398/118 |
| 2002/0089931 A1* | 7/2002 | Takada et al. | 370/232 |
| 2002/0190356 A1* | 12/2002 | Buechler et al. | 257/668 |
| 2003/0061581 A1* | 3/2003 | Baumgartner et al. | 716/4 |
| 2003/0142629 A1* | 7/2003 | Krishnamurthi et al. | 370/249 |
| 2003/0172177 A1* | 9/2003 | Kersley et al. | 709/236 |
| 2003/0179777 A1* | 9/2003 | Denton et al. | 370/503 |
| 2004/0223458 A1* | 11/2004 | Gentle | 370/230 |
| 2005/0216954 A1* | 9/2005 | Ramaiah et al. | 726/22 |
| 2006/0209709 A1* | 9/2006 | Kovacevic | 370/252 |
| 2007/0008897 A1* | 1/2007 | Denton et al. | 370/250 |
| 2007/0147257 A1* | 6/2007 | Oskouy et al. | 370/238 |
| 2007/0168748 A1* | 7/2007 | Musoll | 714/38 |

OTHER PUBLICATIONS

English, John, ADA 95: The Craft of Object-Oriented Programming, http://www.cmis.brighton.ac.uk/~je/adacraft/glossary.htm, pp. 1-11.*

* cited by examiner

*Primary Examiner* — Kwang B Yao
*Assistant Examiner* — Kenan Cehic
(74) *Attorney, Agent, or Firm* — Hamilton & Terrile, LLP; Michael Rocco Cannatti

(57) ABSTRACT

In the present method for use in verification of a device, a plurality of injection flags are provided, each of which is associated with one of a plurality of packet classes. Each injection flag may be of a first or a second state. Next, a packet is generated. If the injection flag of the packet class of the generated packet is in the second state, it is indicated that a packet of that packet class has already been generated, and the device is not tested. If the injection flag of the packet class of the generated packet is in the first state, the device is tested and the injection flag of the packet class of the generated packet is set to the second state. The process is repeated, the running of subsequent tests being determined by the state of the injection flag of the packet class of the generated packet.

5 Claims, 1 Drawing Sheet

METHOD OF GENERATING PACKETS WITHOUT REPETITION IN VERIFICATION OF A DEVICE

BACKGROUND OF THE INVENTION

1. Technical Field

This invention relates generally to device verification, and more particularly, to a method wherein testing combinations are generated without repetition in such verification.

2. Background Art

In the verification of an Ethernet Network Controller, the data packet format for IPSec (Internet Protocol Security) processing typically includes three parts, i.e., the MAC (Media Access Control) header, IP (Internet Protocol) Datagram, and FCS (Frame Check Sequence). For the MAC header, typically, only six different combinations of packet format are involved and need to be tested. However, for the IP Datagram, in the case of the IPv6 header with IPv6 extension headers, several thousand different combinations are involved.

In such verification, a main strategy is the generation of random simulation vectors. In order to fulfill this strategy, a vector generation model is to generate random packet combinations. It will be understood that each simulation is to cover each and every legal packet class. It will also be noted that there are many legal packet classes which can traverse through the network.

However, with each packet being randomly generated, a packet for a particular packet class will be very likely be generated more than once before all legal packet classes are covered, resulting in the device being tested for the same packet class more than once, possibly several times. It will be understood that additional testing for that packet class (after the first test based on that packet class) is inefficient, unnecessary and time-consuming.

Therefore, what is needed is a method of avoiding repetition in the generation of combination values used in testing a device.

DISCLOSURE OF THE INVENTION

In the present method for use in verification of a device, a plurality of injection flags are provided, each of which is associated with one of a plurality of packet classes. Each injection flag may be of a first or a second state. Next, a packet is generated. If the injection flag of the packet class of the generated packet is in the second state, it is indicated that a packet of that packet class has already been generated, and the device is not tested. If the injection flag of the packet class of the generated packet is in the first state, the device is tested and the injection flag of the packet class of the generated packet is set to the second state.

The present invention is better understood upon consideration of the detailed description below, in conjunction with the accompanying drawings. As will become readily apparent to those skilled in the art from the following description, there is shown and described an embodiment of this invention simply by way of the illustration of the best mode to carry out the invention. As will be realized, the invention is capable of other embodiments and its several details are capable of modifications and various obvious aspects, all without departing from the scope of the invention. Accordingly, the drawings and detailed description will be regarded as illustrative in nature and not as restrictive.

BRIEF DESCRIPTION OF THE DRAWINGS

The novel features believed characteristic of the invention are set forth in the appended claims. The invention itself, however, as well as said preferred mode of use, and further objects and advantages thereof, will best be understood by reference to the following detailed description of an illustrative embodiment when read in conjunction with the accompanying drawings, wherein:

BEST MODE(S) FOR CARRYING OUT THE INVENTION

Figure 1:
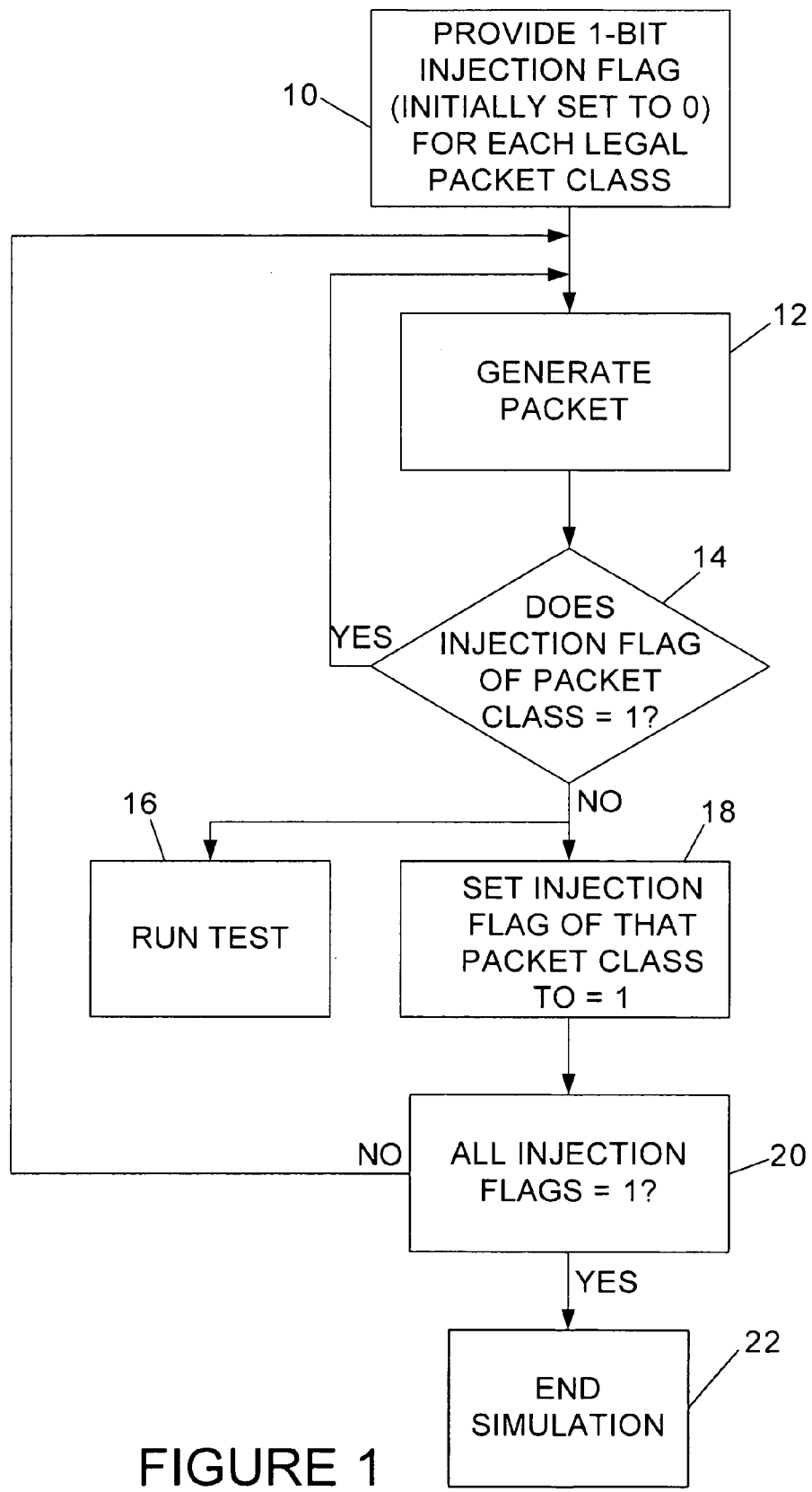
FIG. 1 is a flow diagram illustrating the present invention.

Reference is now made in detail to a specific embodiment of the present invention which illustrates the best mode presently contemplated by the inventors for practicing the invention.

FIG. 1 illustrates the steps of the present invention. In the present simulation, initially, each legal packet class is provided with a 1-bit injection flag. These injection flags will form a long sequence of binary encoding, which may be called network_injection_state. In a simple example:

network_injectionstate={class0, class1, class2, class3}
the injection flags are all initially in the state 0, for example,
Initial State: 4'b0000

Next, let us assume that the packet generator (randomly) generates a class2 packet. If the injection flag of the packet class of the generated class2 packet=0 (it will be remembered that all injection flags were initially set to 0), the test is run, and the injection flag of that packet class is set to 1. This results in the state of the injection flags 4'b0010

Next, assume that the packet generator randomly generates a class3 packet. If the injection flag of the packet class of the generated class3 packet=0 (as indeed is the case), the test is run, and the injection flag of that packet class is set to 1. This results in the state of the injection flags 4'b0011

Next, assume that the package generator randomly again generates a class3 packet. In this situation, the injection flag of the packet class of the generated class3 packet has previously been set to 1. In this situation, the generated packet class3 packet is discarded, and another packet is randomly generated. Similar to the above, for any generated packet, it will be noted whether the injection flag of the packet class thereof is in a 0 or a 1 state. A 0 state indicates that a packet of that packet class had not yet been generated, and the test will be run. A 1 state indicates that a packet of that packet class has been generated, and a test will not be run. The steps described above and illustrated in FIG. 1 are repeated until all the injection flags have been set to 1:

4'b0011

This indicates that packets of all packet classes have been generated, and the simulation is ended.

The overall process can be described in accordance with FIG. 1. Initially, each legal packet class is provided with a 1-bit injection flag, with each value thereof being sent to 0 (10). Next, a packet is randomly generated (12). The state of the injection flag of the packet class of the generated packet is noted (14). If the state of the injection flag is 0, the test is run (16), and the injection flag of that packet class is set to 1 (18). If the state of the injection flag is 1, a test is not run, the generated packet is discarded, another packet is randomly generated, and the procedure subsequent thereto as described above is repeated. The process is continued until all such injection flags have been set to 1. When all the injection flags have been set to 1 (20), the simulation is ended (22).

As noted, during each simulation run, only one packet from each legal packet class will be generated to test the controller. The problem of repetition and inefficiency described above is thus avoided, and simulation time is greatly reduced. It will also be noted that for any given simulation, the sequence of packets is a random, so that each simulation run will be different from the others.

The foregoing description of the embodiment of the invention has been presented for purposes of illustration and description. It is not intended to be exhaustive or to limit the invention to the precise form disclosed. Other modifications or variations are possible in light of the above teachings.

The embodiment was chosen and described to provide the best illustration of the principles of the invention and its practical application to thereby enable one of ordinary skill of the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for use in verification of a device comprising:
   providing a plurality of packet classes;
   providing a single flag, which may be of a first or a second state, for each of the plurality of packet classes;
   generating a packet;
   if the single flag of the packet class of the generated packet is in the first state, testing the device;
   if the single flag of the packet class of the generated packet is in the first state, changing the single flag of the packet class of the generated packet to the second state.

2. A method for use in verification of a device comprising:
   providing a plurality of packet classes;
   providing a single flag, which may be of a first or a second state, for each of the plurality of packet classes;
   generating a packet;
   if the single flag of the packet class of the generated packet is in the first state, testing the device;
   if the single flag of the packet class of the generated packet is in the second state, not testing the device.

3. A method for use in verification of a device comprising:
   providing a plurality of packet classes;
   providing a single flag, which may be of a first or a second state, for each of the plurality of packet classes;
   generating a packet;
   if the single flag of the packet class of the generated packet is in the second state, not testing the device.

4. A method for use in verification of a device comprising:
   (a) providing a plurality of packet classes;
   (b) providing a single injection flag, which may be of a first or a second state, for each of the plurality of packet classes;
   (c) generating a packet;
   (d) if the single injection flag of the packet class of the generated packet is in the second state, not testing the device;
   (e) if the single injection flag of the packet class of the generated packet is in the first state, testing the device and setting the single injection flag of the packet class of the generated packet to the second state.

5. The method of claim 4 and further comprising repeating steps (c) through (e) thereof.

* * * * *